United States Patent Office 2,717,003
Patented Sept. 6, 1955

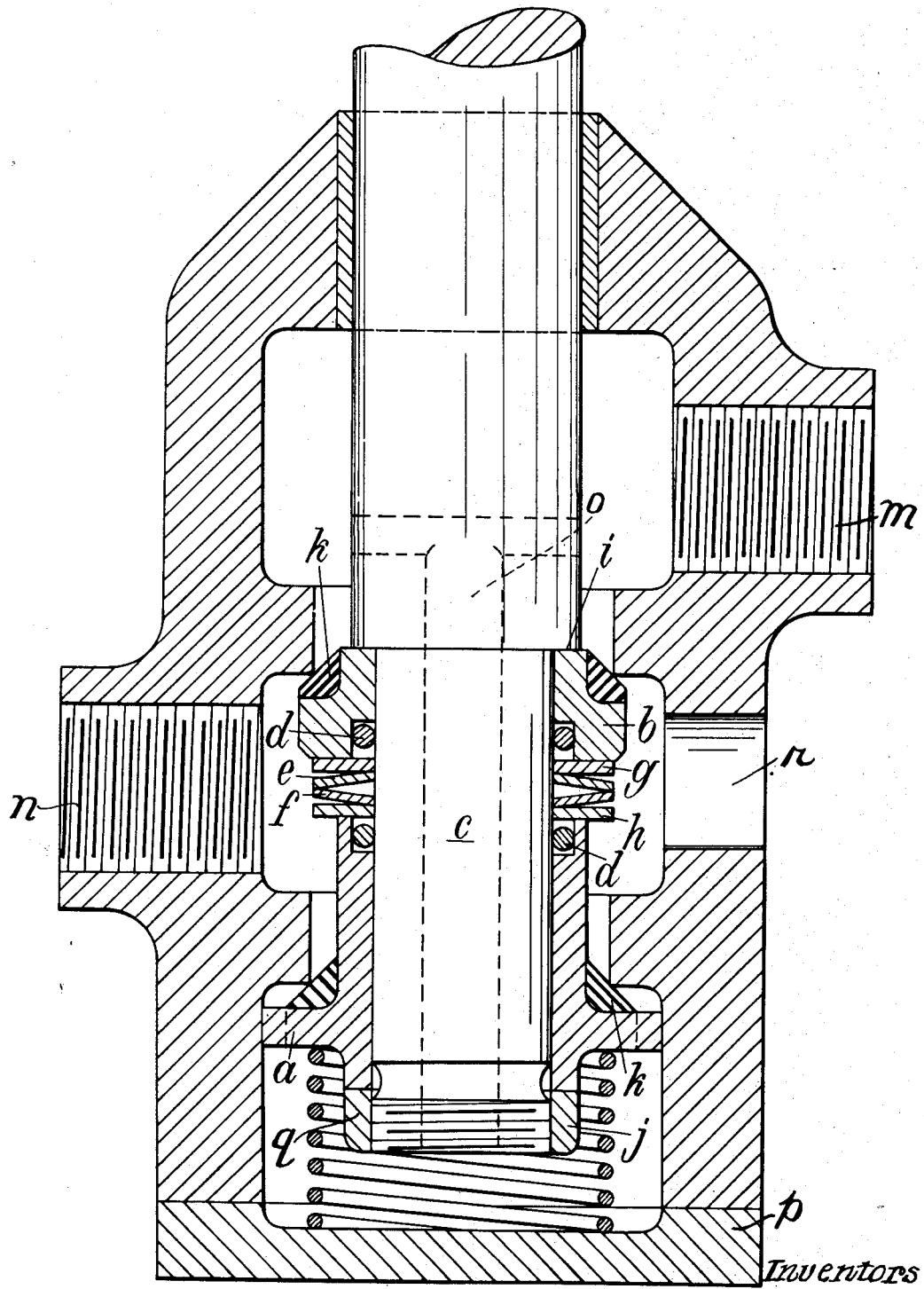

2,717,003

DOUBLE BEAT OR EQUILIBRIUM VALVES

James Bertram Jay, Albert Joseph White, and Joseph Anthony Hunt, Redditch, England, assignors to The Chloride Electrical Storage Company Limited, near Manchester, England Application March 13, 1951, Serial No. 215,314

Claims priority, application Great Britain April 21, 1950

2 Claims. (Cl. 137—625.34)

Double beat or equilibrium valves are usually made with one valve head slightly larger than the other so that the valve may be readily assembled, but the result is that the valve is not exactly balanced. It is often an advantage to have perfect balance.

The object of the present invention is to provide an improved construction of double beat or equilibrium valve which can be in balance and capable of fine adjustment so that a seal is obtained simultaneously at both valve seats.

In accordance with our invention, the two valve heads are carried upon a spindle, upon which they are a good sliding fit, a fluidtight joint being made between each valve head and the spindle by means of a packing ring under radial compression which may be made of rubber or similar material, located in a cylindrical recess in each valve head unit around the spindle.

Between the valve heads are interposed one or more dished spring washers hereafter referred to as Belleville washers which due to their flexibility enable adjustment to be made of distance between the valve heads by means of a nut threading on the end of the spindle and bearing directly upon one valve head whilst the other head bears upon a shoulder on the spindle.

Plain rings are located between the Belleville washer or washers and the adjacent end faces of the two valve heads in which the recesses containing the packing rings are situated.

The valves and valve seats are of similar diameter and bore so that the valve is in balance.

The accompanying explanatory drawing is a sectional elevation of a double beat or equilibrium valve constructed in one convenient form in accordance with this invention.

The two valve heads $a$ and $b$ are each a good sliding fit upon the valve spindle $c$ and a fluidtight joint is made between each valve head and the spindle by a packing ring $d$ located in a cylindrical recess in the valve head around the spindle and radially compressed between the wall of the recess and the spindle so that relative movement between a valve head and the spindle can take place whilst the packing ring maintains a fluidtight joint between the parts. Each packing ring $d$ may be circular in cross section and may roll when its spindle and valve head have relative movements. The branches $m$ and $n$ can be the valve inlet and outlet, or outlet and inlet respectively.

Belleville washers $e$, $f$ are located between the valve heads with plain rings $g$ and $h$ between the washers and the valve heads. Such plain rings prevent displacement of the packing rings $d$ from the recesses in the valve heads.

There is a shoulder $i$ upon the valve spindle against which the valve head $b$ bears and a nut $j$ which threads upon the end of the spindle $c$ presses directly upon the valve head $a$ and determines the distance between the valve seating surfaces and the degree of pressure applied to the Belleville washers.

The actual seating surfaces $k$ upon the valve heads may be made of rubber or other material.

There is a passageway $o$ through the spindle $c$ to establish communication between the branch $m$ and the lower side of the valve head $a$ and the valve $k$.

The load exerted by the Belleville washers between the valve heads is so much greater than that produced by fluid pressure acting on the opposite ends of the valve heads tending to press the valves $k$ towards one another, that the valve assembly is virtually solid.

The flexibility of the Belleville washers enables a simultaneous seal to be made at each seat, whilst the packing rings prevent leakage between the valve heads and the spindle within so that the valve forms an effective seal.

The valve can be readily dismantled by removing the bottom cover $p$ and the nut $q$, when the spindle $c$ can be withdrawn upwards and the valve head $b$ withdrawn through a side opening $r$ in the valve body which is normally closed by a suitable cover.

What we claim is:

1. A double beat or equilibrium valve comprising a casing provided with a fluid inlet and a fluid outlet branch, a valve spindle in the casing, two valve heads each having an outer and an inner side and having a good sliding fit on the spindle, a passageway through the valve spindle establishing communication between the outer sides of the two valve heads and one of the casing branches, the casing having an enclosed space around the adjacent inner sides of the valve heads, the casing having enclosed spaces adjacent the outer side of each of the two valve heads, one branch on the casing leading to the first named enclosed space and the other branch leading directly to one of the second named enclosed spaces and indirectly through the passageway in the spindle to the other of the second named enclosed spaces, a cylindrical recess in each valve head, a packing ring in the said recess making contact with the valve head and the spindle, at least one Belleville washer between the adjacent inner sides of the valve heads, a flat ring between each valve head and the adjacent Belleville washer, one valve head engaging a shoulder on the spindle, two valve seats on the casing upon which the seating surfaces of the valve heads can seat simultaneously, and an adjusting nut carried by the spindle for moving one valve head towards the other and compressing the Belleville washer.

2. A double beat or equilibrium valve as claimed in claim 1, in which each packing ring is of circular cross section and can roll between its valve head and the spindle.

References Cited in the file of this patent

UNITED STATES PATENTS

| | | |
|---|---|---|
| 1,072,796 | Vance | Sept. 9, 1913 |
| 1,871,299 | Bragg | Aug. 9, 1932 |
| 2,189,221 | Paine | Feb. 6, 1940 |
| 2,379,109 | Shaw | June 26, 1945 |
| 2,466,795 | Crot | Apr. 12, 1949 |
| 2,500,156 | Dechart | Mar. 14, 1950 |
| 2,643,090 | Clupht | June 23, 1953 |

FOREIGN PATENTS

| | | |
|---|---|---|
| 506,092 | Germany | 1930 |